United States Patent
Li et al.

(10) Patent No.: US 7,058,666 B1
(45) Date of Patent: Jun. 6, 2006

(54) AUTOMATIC DATABASE MONITORING SYSTEM

(75) Inventors: Yun-Jen Li, Taipei (TW); Cheng Hsi Wen, Hsin-Chu (TW); Jui Pin Chiou, Taichung (TW); Jui Fa Huang, Changhua (TW); Robert Chen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 319 days.

(21) Appl. No.: 10/139,048

(22) Filed: May 2, 2002

(51) Int. Cl.
*G06F 17/30* (2006.01)

(52) U.S. Cl. ..................................... 707/202
(58) Field of Classification Search ............... 707/202, 707/104.1
See application file for complete search history.

(56) References Cited

U.S. PATENT DOCUMENTS

| | | | | |
|---|---|---|---|---|
| 5,721,904 A | | 2/1998 | Ito et al. ...................... 395/608 |
| 5,872,970 A | * | 2/1999 | Pickett et al. ................ 718/101 |
| 5,878,206 A | * | 3/1999 | Chen et al. .................... 714/19 |
| 5,982,890 A | | 11/1999 | Akatsu ........................... 380/4 |
| 6,041,425 A | * | 3/2000 | Kokunishi et al. ............. 714/37 |
| 6,058,420 A | | 5/2000 | Davies ........................ 709/224 |
| 6,085,200 A | * | 7/2000 | Hill et al. .................... 707/202 |
| 6,356,917 B1 | * | 3/2002 | Dempsey et al. ............ 707/202 |
| 6,407,680 B1 | * | 6/2002 | Lai et al. ...................... 341/50 |
| 6,415,259 B1 | * | 7/2002 | Wolfinger et al. .............. 705/8 |
| 6,591,262 B1 | * | 7/2003 | MacLellan et al. ............ 707/2 |
| 6,832,263 B1 | * | 12/2004 | Polizzi et al. ................ 709/246 |
| 6,983,395 B1 | * | 1/2006 | Chen et al. ..................... 714/4 |
| 6,988,139 B1 | * | 1/2006 | Jervis et al. ................. 709/226 |
| 2002/0135794 A1 | * | 9/2002 | Rodriguez et al. ......... 358/1.15 |

FOREIGN PATENT DOCUMENTS

| | | |
|---|---|---|
| CA | 2130065 | 2/1996 |
| TW | 331612 | 5/1998 |
| TW | 381239 | 2/2000 |

\* cited by examiner

*Primary Examiner*—Safet Metjahic
*Assistant Examiner*—Brian Goddard
(74) *Attorney, Agent, or Firm*—Haynes and Boone, LLP

(57) ABSTRACT

A system for automatically monitoring database jobs in simple or complex networking environments to ensure that they run successfully. Failed database jobs are examined, corrected if possible, and re-executed. Database administrators are immediately notified of reoccurring database job failures by e-mail, pager notifications, or other alert methods. The amount of manual intervention is greatly reduced as most database jobs are simply corrected and restarted. The risk of data damage or loss due to subsequent jobs running on databases that are not current is reduced.

27 Claims, 4 Drawing Sheets

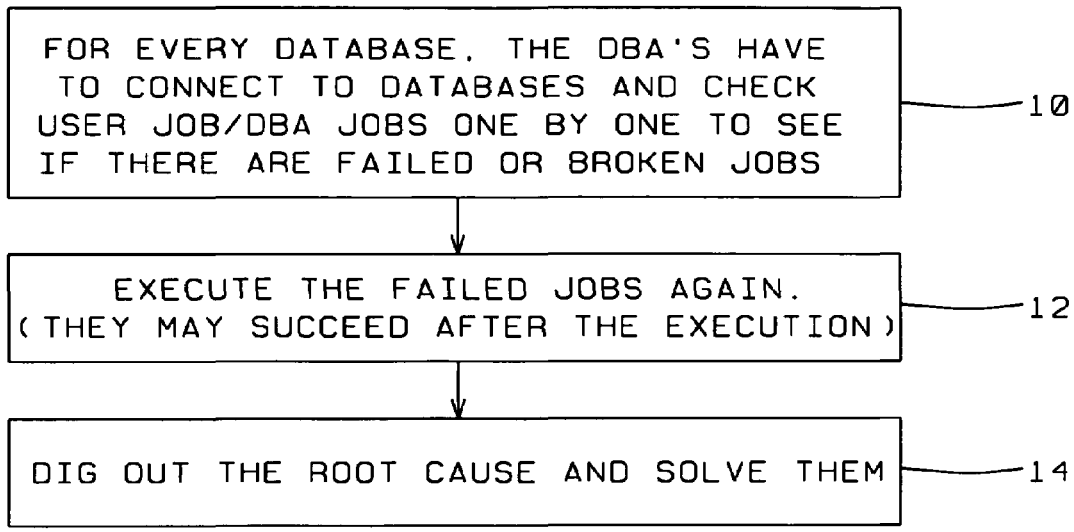
FIG. 1 — Prior Art
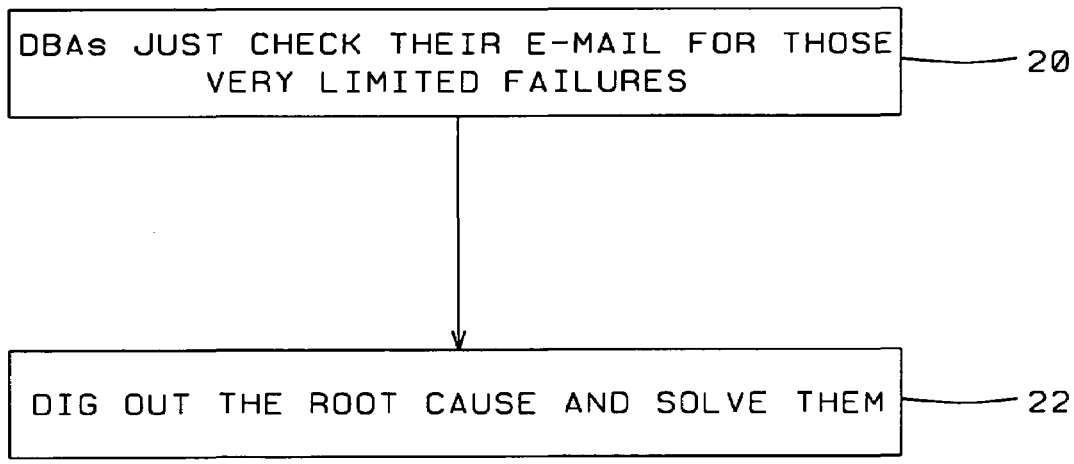
FIG. 2

STEP 0

| WHEN THERE IS A NEW DATABASE LINK BUILT, MANUALLY MAINTAIN BASIC INFORMATION INTO A TABLE WITH STORED HOST IP, HOSTNAME, REMOTE DB USER, PASSWORD, DATABASE LINK | — 40 |

STEP 1

| SELECT FAILED JOBS BY DYNAMIC SQL WHICH CONNECTS TO EVERY MONITORED DATABASE ACCORDING TO THE PRESTORED INFORMATION IN REPOSITORY AND INSERT INTO A TEMPORARY TABLE | — 42 |

STEP 2

| EXECUTE A DYNAMIC SQL WHICH CONNECTS TO THE DATABASE AND RUNS THE FAILED JOBS IN THE DATABASE RESPECTIVELY | — 44 |

STEP 3

| SELECT FAILED JOBS BY A DYNAMIC SQL AS STEP 1 AGAIN | — 46 |

STEP 4

| SEND MAIL OR PAGER FOR THOSE FAILED JOBS | — 48 |

*FIG. 4*

AUTOMATIC DATABASE MONITORING SYSTEM

BACKGROUND OF THE INVENTION

1. Field of Invention

This invention relates generally to controlling update access to databases, and more particularly, to monitoring and checking the status of database jobs and automatic rerunning of any job failures.

2. Description of Related Art

In a typical, large data processing facility with local and remote networked databases, jobs of work are submitted to update a plurality of databases. The number of these jobs can be very large as almost all aspects of the business are documented or controlled by the information contained in these databases. Many of the database jobs are critical to the day-to-day running of the business. Also, the sequence in which these jobs are run is important as one job can require the updated data from another job. A job run out of sequence can cause a serious loss of data that can take hours to correct or if not detected, incorrect data results that can cause serious harm to the business.

To ensure that jobs are run in sequence, elaborate procedures are put in place to make sure prerequisite jobs are completed before the dependent job is started. Operating system error logs and stop-on-error features are used to detect failed jobs and can frequently alert the dependent jobs not to start. This prevents most serious problems from occurring but can leave a large number of jobs not run until the error is corrected and the jobs are all resubmitted.

There can be numerous reasons why jobs fail to run or are not complete. It could simply be because access to the database was temporarily lost over the network or because the detection of a serious programming or data error caused the job to fail. In these cases, the operating system logs the job failures. Database Administrators (DBAs) monitor jobs for these failures. They must analyze failures and take corrective action to get the job run and repair any data which may have been effected by it or subsequent jobs.

DBAs spend a significant amount of time monitoring and taking corrective action because of the modern complexity of the numerous databases. Frequently, many databases are connected remotely over networks. Access privileges to all the databases must be given to the DBAs since they may need to get to them to restore damaged data or to check if the data is correct. This is a large security exposure to most companies.

Several methods or systems related to database access and control are available. In U.S. Pat. No. 5,982,890 (Akatus) a method and system for detecting fraudulent data updates is described. In U.S. Pat. No. 5,721,904 (Ito et al.) a database access system for distributed systems is explained. In U.S. Pat. No. 6,058,420 (Davies) an alarm-monitoring server system, apparatus, and process are described.

The high probability of data damage due to database job errors requires extensive job monitoring by DBAs. This is very costly, error prone, and a security risk. It requires the new approach of this invention.

SUMMARY OF THE INVENTION

This invention's overall objective is to provide a system and method that monitors database jobs to ensure that they are run and also that they are run in their proper order so as to prevent data damage by jobs running without their prerequisite jobs having run. This invention provides a method to greatly reduce the time spent in manually monitoring database jobs and reduce the cost of recovery when damage is done by the failure of some database jobs while others continue to run.

A more specific objective is to create tables containing database job information that can be used to determine when and how the job should be rerun. With information from the tables, jobs can be knowledgeably rerun. This understanding of the database jobs is essential as sequence is critical. Another objective is to provide monitoring even in the most complex networks. With databases expanding beyond local systems, ensuring that database jobs run in all parts of the enterprise is not an easy task.

Still another objective is to inform DBAs of failed database jobs that can not be successfully run by the system so that they can take immediate action. This prevents a major backup of jobs by fixing the problem right away. E-mail or paging is used by the system to notify the DBAs in real time.

These objectives are achieved by the method of this invention. The automatic database monitoring system ensures that database jobs are successfully completed in the right sequence and alerts the DBAs immediately if serious problems exist.

BRIEF DESCRIPTION OF THE DRAWINGS

This invention will be described with reference to the accompanying drawings, wherein:

FIG. 1 is a flow diagram of the prior art business flow.

FIG. 2 is a flow diagram of the new business flow.

FIG. 4 is a flow diagram of the process flow for monitoring.

DETAILED DESCRIPTION OF THE PREFERRED EMBODIMENT

Figure 3:
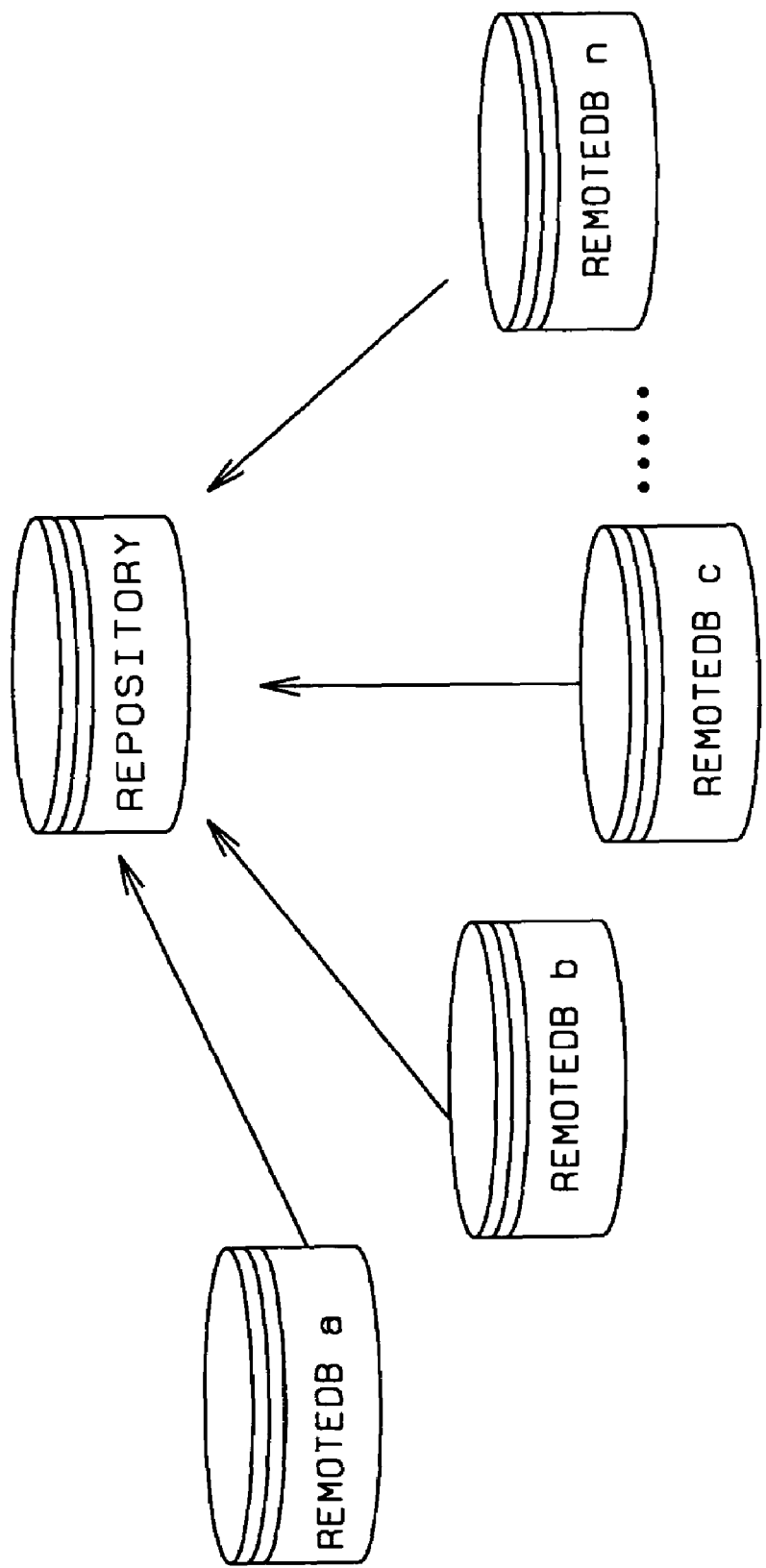
FIG. 3 is a system diagram of the architecture.

In large enterprises today, large amounts of information are stored on computer systems in databases. Many of these databases contain data that is critical to the day-to-day running of the business. They need to be updated frequently so that important decisions and events are based on accurate and current data.

Just as computer systems have become more networked, so too have databases. Where databases were once locally attached to mainframes, today they can physically be in all remote locations of the enterprise attached by the many available networks. Data in a remotely attached database may be needed to update a locally attached database. The network now becomes an important factor in the updating of the databases. If it is down or a critical database is not connected, other databases are affected.

Most large databases are updated by submitting jobs that contain the location of the updates and the control information to begin the update. Often a database update is dependent on jobs run previously. If a previous job failed to run, data can be damaged.

To ensure databases are not damaged, Database Administrators (DBAs) are constantly monitoring for the successful completion of the database jobs. FIG. 1 shows the prior art business flow. DBAs have to insure that all databases required to do an update job are connected 10. This is done by checking for job failures. The DBAs attempt to fix the job failure problem utilizing messages from the failed jobs output. The job is submitted again for execution 12. If it is a success, no further action is required. If it fails again, the DBAs must determine the root cause and solve the problem 14. This is a very costly and time-consuming process. Additionally, if a job fails but is not recognized as failed, a subsequent job can run against the back level of data and cause serious data damage or loss. The new invention eliminates these problems.

The Automatic Database Job Monitoring System provides a new method to run and control database jobs. Once the system is in place, the new business flow is simplified as seen in FIG. 2. Since the system submits and monitors the database jobs, the work of the DBAs is reduced to checking e-mail and pagers, or other means for alerts of job failures 20. Their time is now spent in solving problems with the limited number of jobs that fail 22. The entire database connecting and monitoring function is taken over by the system.

The system architecture of the monitoring system is shown in FIG. 3. Key to the system is the repository 30. The repository is a database on a central computer system connected to the network. It contains a description of each monitored database 32 that is maintained by the DBAs. As new databases need to be monitored, the DBAs add them to the repository.

To successfully monitor each database, the repository contains: the location of the database (host IP address), the host name, the remote database user, the database password, and the database link instructions. FIG. 4 shows the process flow steps for the monitoring of the databases. Step 0 is the manual updating of the repository database with the above content 40. This is done once. Database jobs are run on a continuous basis as required. Only those noted in the repository are monitored for failure.

In step 1, the automatic database job monitoring system periodically executes a programmed procedure that runs a dynamic SQL search routine. It has the ability to connect to every monitored database according to the pre-stored information in the repository 42. A temporary table is created in the repository for the failed jobs it finds. In step 2 44, the SQL routine then establishes a connection to the failed database using programed dynamic SQL to execute the failed jobs. In step 1 the failed jobs are colleted. In step 2 the failed jobs are executed right in each failed database.

In step 3 46, now a systematic recheck is preformed by the dynamic a SQL program to look for failed jobs that really need human intervention. This is done exactly the same way as in step 1 with the additional knowledge of which jobs have failed previously on the retry. If the job fails again, an e-mail, pager notification, or other alert is sent to the DBAs in step 4 for their immediate action 48. Notification speed is critical as jobs involving key and active databases can back up very quickly causing data not to be current.

Figure 5:
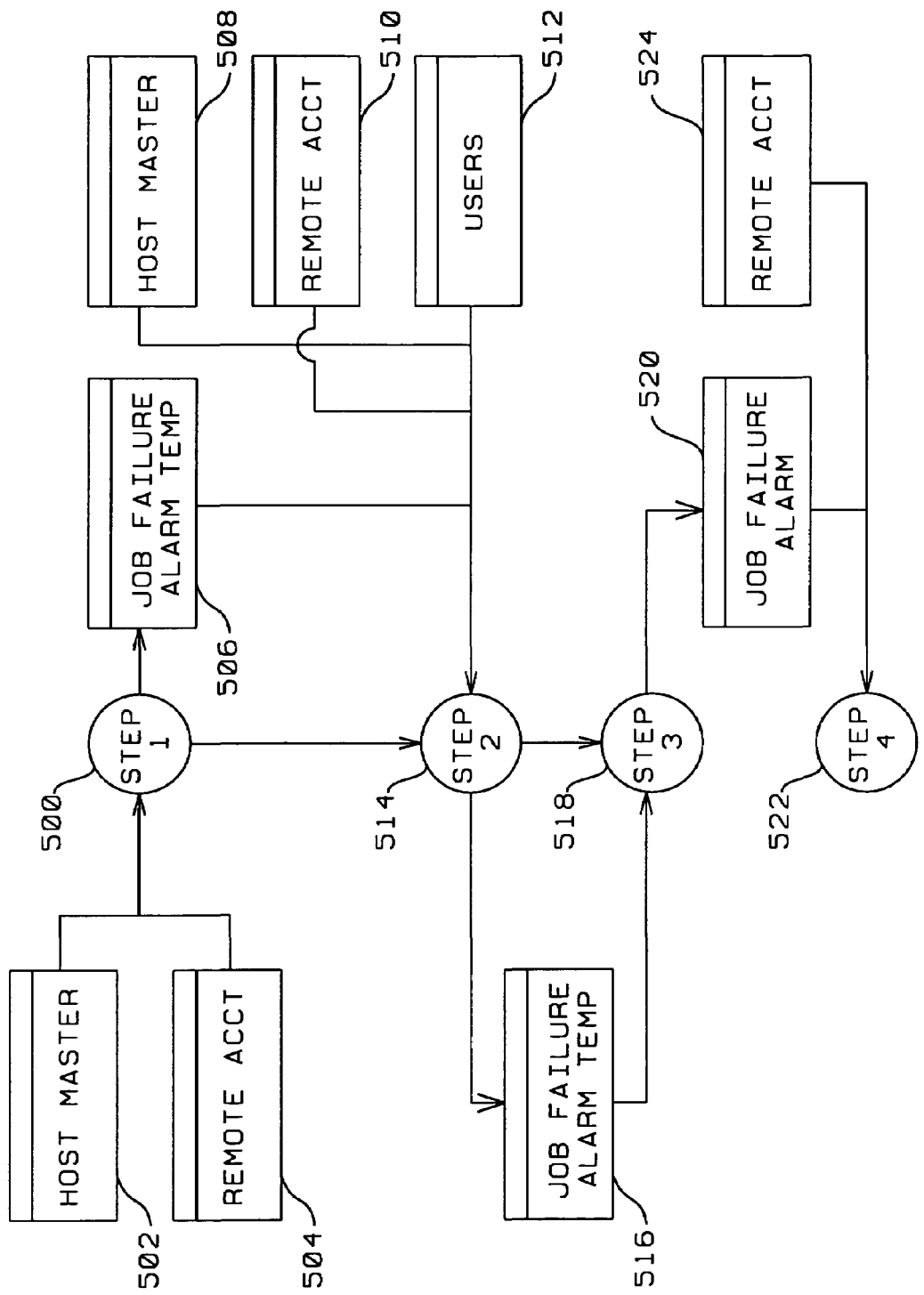
FIG. 5 is a data flow diagram of the system.

Another way to view the system in operation is to look at the data flow diagram in FIG. 5. Starting with step 1 500, there is a host master system that runs all the monitored database jobs associated with the local host master system 502. There are multiple remote accounts 504, the number depending on the complexity of the enterprise, that run database jobs. The SQL routine runs and creates the job failure alarm temporary table 506. At step 2 514 the host master 508 and the remote account 510 database jobs are connected. If the database is contained on a user workstation, that connect is made 512. The failed database job is then run again. The job failure alarm temporary table 516 is then updated if the job fails again. In step 3 518, the table is read and it is noted that this is a second failure. Remote account 524 information is supplied telling weather the database was actually connected to help in diagnosing the failure. A job failure alert 520 is then created at step 4 522 and the DBAs are immediately notified with information about the failed job so they can correct the problem.

The method of the invention provides advantages over the prior art including eliminating the need for DBAs to manually go through numerous database job status listings to determine if the database jobs have run successfully. Database jobs are automatically rerun based on predefined conditions that greatly reduce DBAs manual intervention and saves time and costs. Another important advantage of the method of the invention is reduction of data damage and loss due to database jobs being run out of sequence.

While the invention has been particularly shown and described with reference to preferred embodiments thereof, it will be understood by those skilled in the art that various changes in form and details may be made without departing from the spirit and scope of the invention.

What is claimed is:

1. An automatic database job monitoring method, comprising:
  a. creating tables that store database jobs;
  b. recognizing the sequence the jobs must be run in;
  c. rerunning of failed jobs automatically in said sequence when finding failed jobs;
  d. recording all said failed jobs and matching user-defined scheduling for that said failed job, and
  e. sending alerts to administrators for certain said fail jobs when said failed jobs fail again.

2. The automatic database job monitoring method of claim 1, wherein job data is stored in a central repository with the necessary information to restart failed jobs.

3. The automatic database job monitoring method of claim 1, wherein the repository contains information about the job sequence to ensure failed jobs are rerun in the correct order so as not to cause data destruction or loss.

4. The automatic database job monitoring method of claim 1, wherein failed jobs are found by a routine that is coded to locate failed jobs throughout the network and then rerun.

5. The automatic database job monitoring method of claim 1, wherein a connection can be made and other problems resolved for the failed databases and then the job can be rerun.

6. The automatic database job monitoring method of claim 1, wherein failed jobs are recorded in tables and analyzed by the routine to insure that they are rerun according to predefined criteria.

7. The automatic database job monitoring method of claim 1, wherein Database Administrators (DBAs) are immediately notified of database job failures when a database job fails more than once or from predefined criteria by using e-mail, pagers, or other alert methods.

8. A software system for automatically monitoring database jobs that are running on databases that reside locally as well as on remote networked systems comprising:
  a. a repository database and tables that store database job definitions;
  b. a means of sequencing database jobs that are monitored in said repository database so that they can be rerun correctly;
  c. a means to find and rerun a failed database job that are monitored in the repository database;
  d. a program routine that can find said failed database job throughout the network, and
  e. the means to immediately send e-mail, pager notification, or other alert to DBAs for said failed database jobs found by said program routine so that DBAs can take action to resolve the problem.

9. The software system for automatically monitoring database jobs of claim 8, wherein the repository database is stored on a system that has access to all databases locally and on the network.

10. The software system for automatically monitoring database jobs of claim 8, wherein sequence dependency is defined in the repository database and may or may not be of any significance to rerunning failed database jobs.

11. The software system for automatically monitoring database jobs of claim 8, wherein the system analyzes said job failures attempt to connect to the database whose job failed, rerun the database job based on the repository predefined criteria, and notify DBAs if failure still occurs after the predefined reruns.

12. The software system for automatically monitoring database jobs of claim 8, wherein a SQL routine runs on a continuous basis to locate failed jobs from system logs that contain job status information.

13. The software system for automatically monitoring database jobs of claim 8, wherein a software routine runs on a continuous basis to locate failed jobs from system logs that contain job status information.

14. The software system for automatically monitoring database jobs of claim 8, wherein an e-mail, pager notification, or other type of alert is automatically sent to DBAs for failed database jobs that continue to fail after the system has tried to correct connections to the database and rerun the job.

15. An automatic database job monitoring method comprising:
 a. creating a repository database that contains manually-entered criteria by DBAs that define how database jobs should be rerun if said database jobs fail;
 b. recognizing the sequence said database jobs must be run in;
 c. rerunning of said database jobs automatically in said sequence when finding said failed jobs;
 d. recording all failed database jobs and matching user-defined scheduling for that said database job, and
 e. sending e-mail, pager notifications, or other alerts to administrators for certain said failed database jobs.

16. The automatic database job monitoring method of claim 15, wherein the repository database is the primary controlling database for the methods steps.

17. The automatic database job monitoring method of claim 15, wherein the repository contains: the location of the database, the host name, the remote database user, the database password, the database link instructions, plus any other specific information the DBAs request for the rerunning of the job if it fails.

18. The automatic database job monitoring method of claim 15, wherein the repository contains dependent job information so rerunning of the failed job is not done if a dependent job has also failed.

19. The automatic database job monitoring method of claim 15, wherein an analyzing programmed routine finds the failed job from system logs.

20. The automatic database job monitoring method of claim 15, wherein it updates a temporary table in the repository noting the failure.

21. The automatic database job monitoring method of claim 15, wherein the analyzing programmed routine connects to the database and reruns the failed database job.

22. The automatic database job monitoring method of claim 15, wherein the analyzing programmed routine immediately alerts the DBAs by e-mail, pager notification, or other alert method if it cannot connect to the database.

23. The automatic database job monitoring method of claim 15, wherein the analyzing programmed routine looks for rerun job failures.

24. The automatic database job monitoring method of claim 15, wherein it immediately notifies the DBAs of the second failure by e-mail, pager, or other alert methods.

25. The automatic database job monitoring method of claim 15, wherein DBAs are notified only for persistent database job failures or the inability to connect to the database.

26. The automatic database job monitoring method of claim 15, wherein DBAs control the monitoring of database jobs and the actions to be taken upon a job failure by their updates in the repository database.

27. The automatic database job monitoring method of claim 15, wherein the programmed routine that finds the failed jobs from the system logs can be written in SQL or other search and query languages, or be coded in any programming language that can provide the suitable logic.

* * * * *